United States Patent [19]
Lang-Ree

[11] 4,073,225
[45] Feb. 14, 1978

[54] ROCKING MEATBALL COOKER
[75] Inventor: Nils Lang-Ree, Los Altos, Calif.
[73] Assignee: N.P.I. Corporation, Burlingame, Calif.
[21] Appl. No.: 751,265
[22] Filed: Dec. 17, 1976
[51] Int. Cl.² ............................................. A47J 27/00
[52] U.S. Cl. ........................................ 99/339; 99/345; 99/423; 99/440; 99/443 C; 198/771; 366/144; 366/237
[58] Field of Search ................. 99/339, 360, 345, 422, 99/423, 443 C, 427, 440, 348, 443 R; 198/756, 771; 259/76, 77; 34/164; 432/121, 134

[56] References Cited
U.S. PATENT DOCUMENTS

| | | | |
|---|---|---|---|
| 1,634,259 | 7/1927 | Hutchinson | 99/348 |
| 1,766,445 | 6/1930 | McKay | 99/443 C |
| 2,404,650 | 7/1946 | Newkirk | 432/134 |
| 2,939,383 | 6/1960 | Kanaga | 99/427 |
| 3,163,929 | 1/1965 | Goodstein | 29/403 |
| 3,807,292 | 4/1974 | Cinter | 99/443 R |

FOREIGN PATENT DOCUMENTS

| | | | |
|---|---|---|---|
| 494,965 | 9/1919 | France | 432/134 |
| 94,943 | 11/1897 | Germany | 34/164 |

Primary Examiner—Billy J. Wilhite
Attorney, Agent, or Firm—Lothrop & West

[57] ABSTRACT

A cooker for meatballs and the like has a semi-cylindrical trough mounted on a frame for rotation about its own substantially horizontal but slightly inclined axis. The trough is rocked to and fro by a controlled driving device to swing between extreme positions and optionally to stop between the extreme positions. The trough has a meatball inlet at one end and a meatball outlet at the other end. Between those ends the trough has interrupted, interior, helical vanes staggered with respect to each other on opposite sides of the center of the trough to impell the meatballs from one end to the other as the trough rocks. The trough includes a jacket having inlet and outlet connections for heating oil and may also have radiant heaters directed toward the inside of the trough.

5 Claims, 4 Drawing Figures

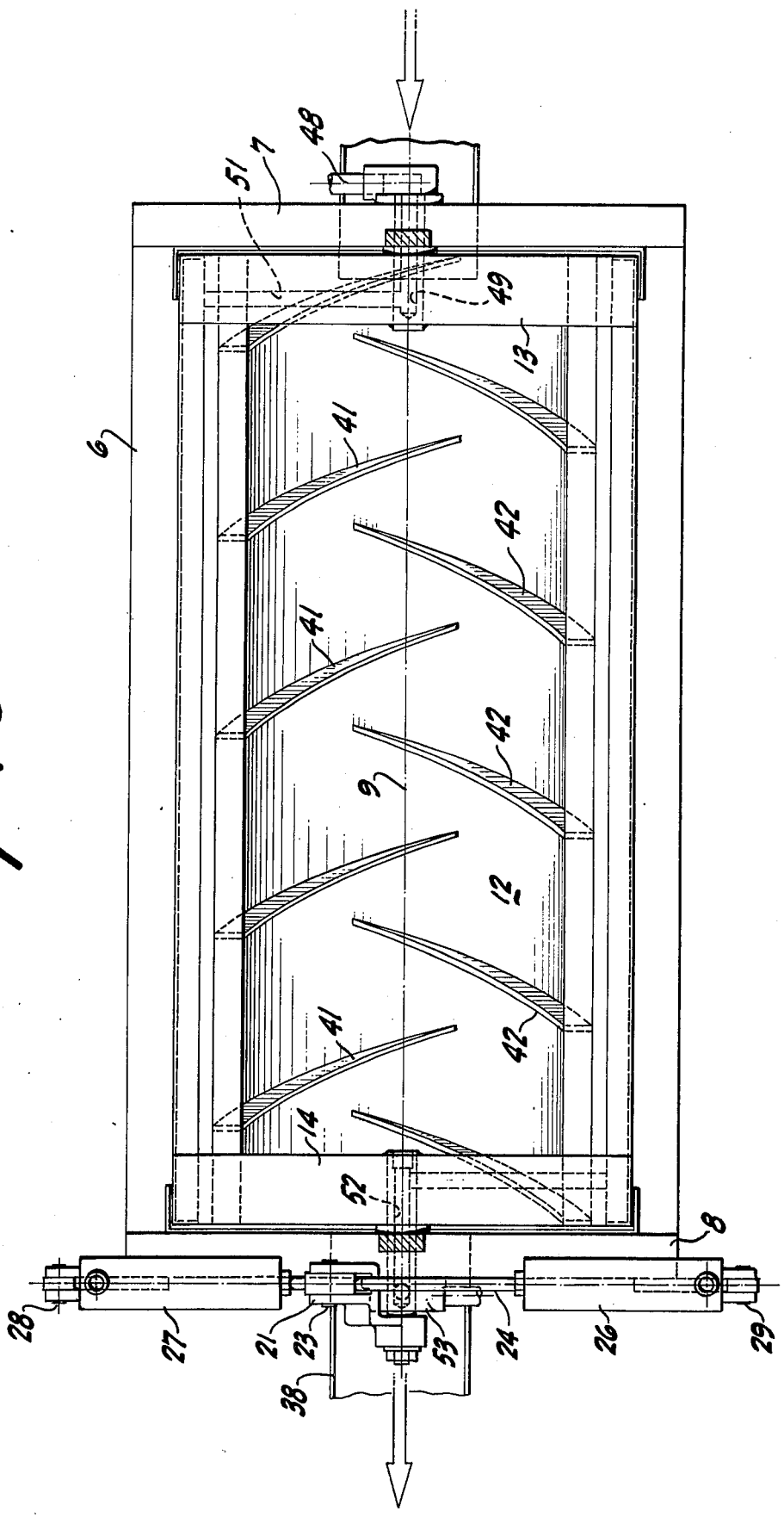

ROCKING MEATBALL COOKER

BRIEF SUMMARY OF THE INVENTION

For the continuous cooking of relatively large numbers of meatballs or like items able to roll or slide, there is provided an open-top, rocking trough heated to an appropriate temperature and receiving uncooked or partially cooked meatballs at one end and discharging cooked meatballs from the other end. The trough is rocked to and fro by a controlled driver which, if so programmed, sometimes stops the trough in arbitrary positions for better cooking and shaping of the contents. The contents can readily be inspected while the cooker is in use and can easily be cleaned between uses.

BRIEF DESCRIPTION OF THE SEVERAL VIEWS OF THE DRAWING

FIG. 3 is a plan of the meatball cooker, portions being broken away.

DETAILED DESCRIPTION

Figure 1:
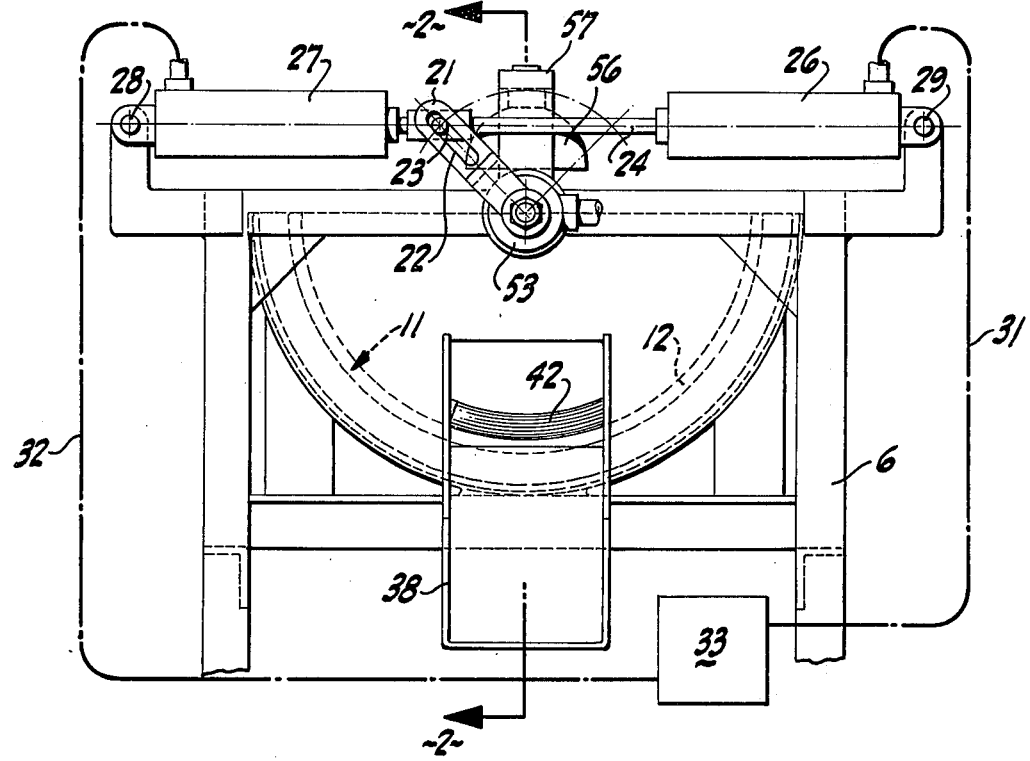
FIG. 1 is an end elevation of a rocking meatball cooker constructed pursuant to the invention, portions being broken away.

There are various requirements for the relatively large-scale cooking of objects such as meatballs that are approximately spherical and have the ability to roll or slide or both in connection with a cooking surface. A previous difficulty has been that some machines for cooking meatballs process them into an almost exactly geometrical or spherical shape. While the meatballs are reasonably well cooked in that fashion, they do not for some reason appeal to the public, and the cooking may not be optimum. There is an advantage in providing a machine for cooking meatballs in which the meatballs although capable of rolling nevertheless have irregularities such as flat spots, protuberances and the like as distinct from a true spherical shape.

Another object of the invention is to provide a cooker in which the operation of the mechanism during cooking can very easily be observed not only from the standpoint of gauging quantities, but from the standpoint of sanitation and the like.

A further object of the invention is to provide a meatball cooker that is easily cleaned and inspected at any time.

A further object of the invention is to provide a meatball cooker in which the motion of the cooker is beneficial with respect to cooking the contents.

The foregoing objects and others are attained in various forms of the invention. One embodiment, illustrated herein, includes a main frame 6 preferably comprised of the customary shapes and fastenings and extending from an inlet end 7 to an outlet end 8. Adapted to rock on the frame about a substantially longitudinal axis 9, which, however, is slightly inclined downwardly from the inlet end 7 toward the outlet end 8, is a trough 11. The trough is an open-top container having an inner wall 12 of semi-cylindrical extent concentric with the axis 9 and having diametrical connecting bars 13 and 14 extending across the trough at the ends thereof.

One of the bars 13 is joined to a shaft 15 concentric with the axis 9 and extending through a journal 16 on the frame 6 at the inlet end 7 thereof. Correspondingly, the cross member 14 is connected to a shaft 17 disposed on the axis 9 and extending through a journal 18 on the frame 6. With this arrangement, the trough is free to rock to and fro about the axis 9. Motion of the trough is provided by a connection to the shaft 17. This includes a crank 21 having a slot 22 engaged by a pin 23 on an extended piston rod 24 adapted to reciprocate within cylinders 26 and 27 removably secured to the frame 6 by pins 28 and 29.

Single acting pistons (not shown) on the rod 24 and within the cylinders 26 and 27 are operated by pressure fluid received through conduits 31 and 32 extending from a control 33. The control is sensitive to the position of the trough about the axis at any time and is effective to provide repetitive oscillation of the trough through approximately 90°; that is, 45° each side of center. The control is also effective to regulate such oscillation so that at indicated points or intervals between the extreme positions the trough can be held stationary for relatively short times. The stationary positions of the trough are often at various different inclines.

The trough is provided with an inlet chute 36 at one end through which uncooked or partly cooked meatballs such as 37 are introduced to the interior of the trough. Similarly, at the other end there is an outlet chute 38 for receiving the cooked or processed meatballs and carrying them to a point for further processing or for packing.

In order to impell the meatballs to travel from the inlet end 7 to the outlet end 8, the interior of the trough is provided with a number of helical vanes such as 41 and 42. Each of these is interrupted and extends over only about one-quarter of a circle or one-half of the interior periphery of the trough. Each vane is an upstanding wall comparable to the height or diameter of a meatball, but usually slightly less than the actual diameter of a meatball. The vanes 42 on opposite sides of the center line or middle of the trough extend as helices of opposite hand and also are somewhat staggered or overlapped with respect to each other on the opposite sides of the center of the trough. As shown, the two different or opposite-handed sets of vanes 41 and 42 are spaced axially from each other at their central ends but nevertheless are overlapped in a circumferential direction to a small extent.

Figure 4:
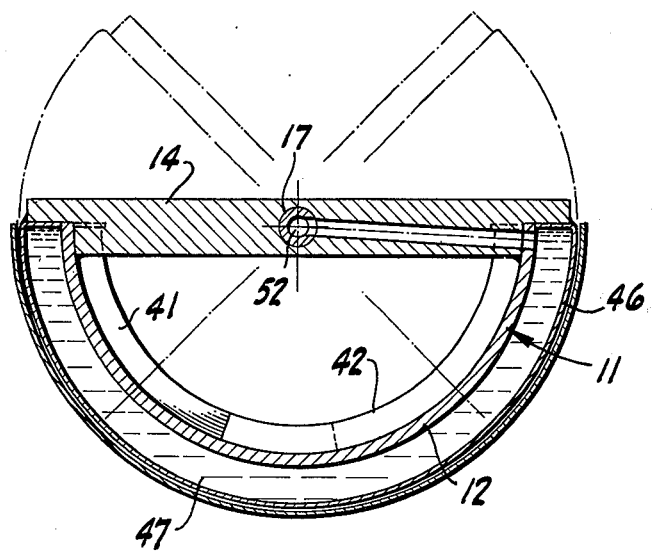
FIG. 4 is a cross-section, the plane of which is indicated by the line 4—4 of FIG. 3, some adjacent portions being omitted for clarity.
Figure 2:
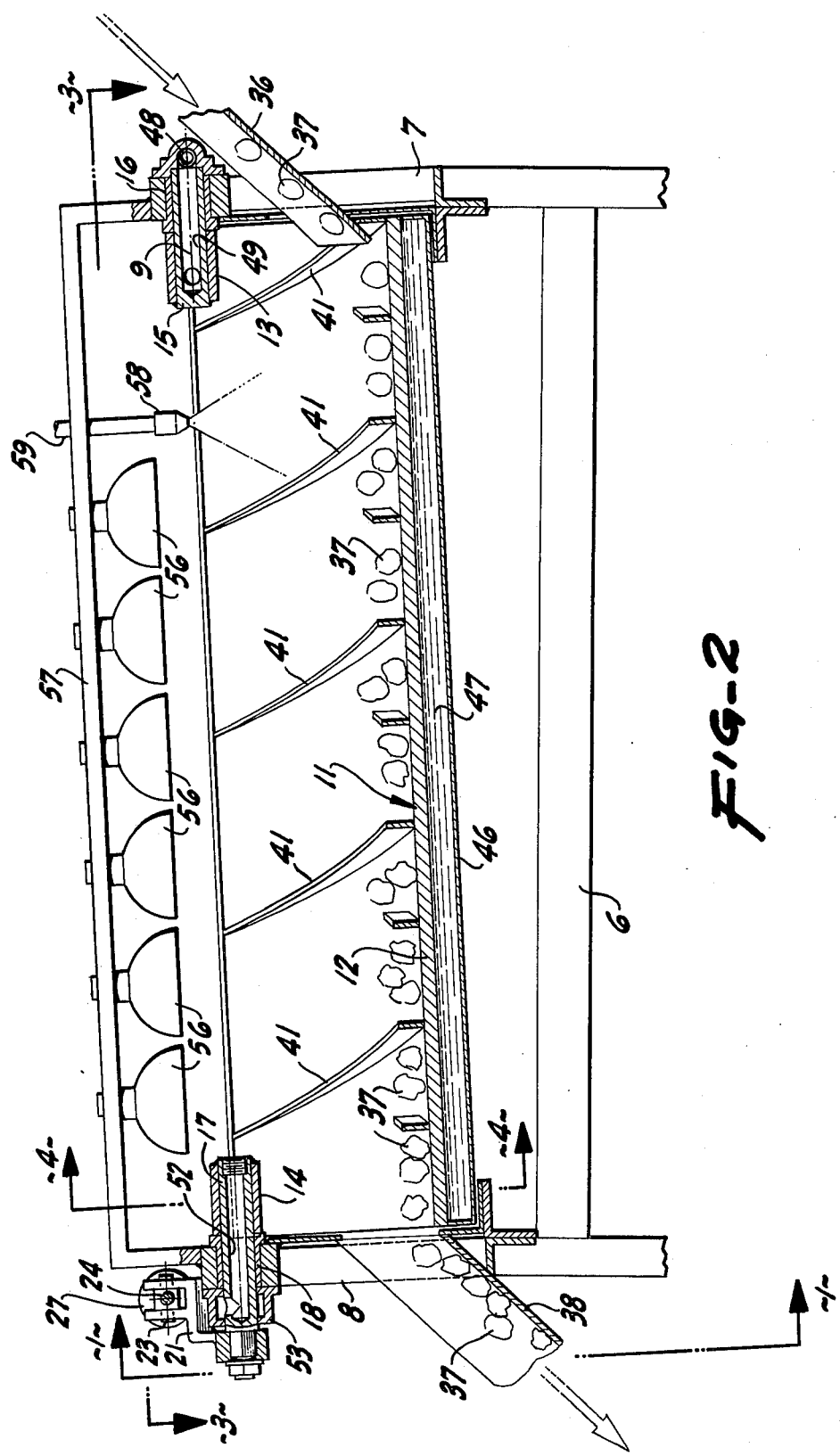
FIG. 2 is a cross-section, the plane of which is indicated by the line 2—2 of FIG. 1.

Since the meatballs are to be cooked as they travel through the device, the wall 12 is largely encompassed by an outer wall 46 with the wall 12 forming an intervening jacket 47. Hot cooking oil is brought into the jacket 47 through an inlet connection 48 from a suitable source (not shown) of hot oil under low pressure. That oil travels through the hollow bore 49 of the shaft 15 and then travels through a passageway 51 (FIG. 4) in one of the diametral bars 13. Oil from the jacket 47 also travels through a similar passageway in the bar 14 to the central bore 52 in the shaft 17, then through a rotary connection 53 to a duct leading the oil back to the pump and heater mechanism. In this way the semi-cylindrical trough is heated from the outside by the jacket full of circulating heating oil.

In some instances the heat supply may be augmented by a plurality of radiant lamps 56 suspended on a frame member 57 so as to radiate to the interior of the trough.

It is sometimes desired to add a cooking oil to the meatballs. If so, there is provided a nozzle 58 connected by a pipe 59 to a supply of liquid material such as melted oleomargarine. This is lightly sprayed into the interior of the trough and tends to coat the meatballs.

In the operation of this structure, the control 33 is energized to oscillate the trough to and fro between its extreme positions and to stop periodically or randomly at some intermediate point or points for a few seconds. The hot oil is supplied to the jacket 47, and the lamps 56, if used, are illuminated. Meatballs 37 are supplied through the inlet ramp 36 and fall near the central portion of the trough. As the trough oscillates from side to side, the meatballs inter-engage with the various vanes 41 and 42 and are impelled axially toward the outlet. The meatballs likewise roll, slide and tumble on the interior surface of the rocking trough for the most part, but when the trough periodically or intermittently stops then the meatballs tend to either stay in position or congregate toward the lower central portion of the trough beneath the axis. In stopped or sliding positions particularly, the meatballs tend to flatten somewhat and absorb heat well. They cook by absorbing heat through the wall 12 and from the vanes 41 and 42, which are good conductors. In encountering the vanes and because of the random trough stopping and tumbling over and collisions between the meatballs themselves, while they can still advance toward the outlet, they emerge finally in the trough 38 in something other than spherical shape and have a number of flattened and irregular portions thereon, a shape deemed preferable by the consumer.

I claim:

1. A rocking meatball cooker comprising a frame, an open top trough, means for mounting said trough on said frame for rotation about a substantially horizontal axis, means for repetitively rocking said trough to and fro about said axis through about 90°, means for subjecting said trough to heat, means for supplying one end of said trough with meatballs to be cooked, means for releasing cooked meatballs from the other end of said trough, and vanes in said trough helical about said axis and interrupted partway across said trough for impelling said meatballs from said one end to said other end of said trough.

2. A device as in claim 1 for cooking meatballs having substantially a predetermined diameter and in which said interrupted helical vanes project inwardly from the inside surface of said trough a radial amount substantially comparable to the diameter of a meatball, each vane extending from a point near a margin of said trough to a point near the center of said trough, and said vanes on the opposite sides of said center of said trough being staggered with respect to each other.

3. A device as in claim 1 in which said trough is substantially a semi-cylinder and said vanes extend for substantially a half of said semi-cylinder and said vanes on opposite sides of said trough have opposite-hand helical contours.

4. A device as in claim 1 in which said rocking means includes a control for operating said rocking means to swing said trough between extreme positions and for stopping said trough between said extreme positions.

5. A device as in claim 1 in which said means for subjecting said trough to heat includes means on said frame above said trough for radiating heat to the interior of said trough through the open top thereof.

* * * * *